United States Patent [19]

Bowman

[11] Patent Number: 5,298,881
[45] Date of Patent: Mar. 29, 1994

[54] LOW LIQUID LEVEL MONITORING AND WARNING APPARATUS AND METHOD

[75] Inventor: Tim J. Bowman, Bexley, Great Britain

[73] Assignee: Ford Motor Company, Dearborn, Mich.

[21] Appl. No.: 854,139

[22] Filed: Mar. 19, 1992

[30] Foreign Application Priority Data

Mar. 23, 1991 [GB] United Kingdom ............... 91/06211

[51] Int. Cl.$^5$ ..................... B60Q 1/00; G08B 21/00
[52] U.S. Cl. .................. 340/450.3; 340/450.1; 340/450.2; 340/450; 340/618
[58] Field of Search .............. 340/450, 450.1, 450.2, 340/450.3, 474, 460, 618

[56] References Cited

U.S. PATENT DOCUMENTS

| | | | |
|---|---|---|---|
| 1,594,806 | 8/1926 | Williams | 340/450.2 |
| 3,253,256 | 5/1966 | Hull | 340/450.2 |
| 3,983,549 | 9/1976 | Akita | 340/618 X |
| 4,090,408 | 5/1978 | Hedrick | 340/450.2 |
| 4,404,641 | 9/1983 | Bazarnik | 340/457.4 |
| 4,593,357 | 6/1986 | Van Ostrand et al. | 340/439 |
| 4,598,272 | 7/1986 | Cox | 340/539 |
| 4,630,027 | 12/1986 | Muhlberger et al. | 340/457.4 |
| 4,731,730 | 3/1988 | Hedrick et al. | 340/450.2 |
| 4,739,301 | 4/1988 | Steffenhagen | 340/450.3 |
| 4,768,377 | 9/1988 | Habelmann et al. | 340/450.3 |
| 4,845,469 | 7/1989 | Benda | 340/450.3 |
| 4,845,623 | 7/1989 | Korb | 340/459 |
| 4,876,529 | 10/1989 | Kubota et al. | 340/459 |
| 4,912,646 | 3/1990 | Cerruti | 340/450.2 |
| 4,914,419 | 4/1990 | Bragenzer et al. | 340/459 |

FOREIGN PATENT DOCUMENTS

| | | | |
|---|---|---|---|
| 0064202 | 11/1982 | European Pat. Off. | 340/450.2 |
| 2009417 | 9/1982 | United Kingdom . | |
| 2138947 | 10/1986 | United Kingdom . | |

OTHER PUBLICATIONS

Telford "Windscreen Washer Level Monitor", *Radio & Electronics Constructor* vol. 31, No. 9, pp. 534–540 (May 1978).

*Primary Examiner*—Hezron E. Williams
*Assistant Examiner*—Christine K. Oda
*Attorney, Agent, or Firm*—Richard D. Dixon; Roger L. May

[57] ABSTRACT

A sensor is coupled to a reservoir for generating a first signal responsive to the liquid level therein falling below a first level spaced above an output port and indicative of a reserve level of liquid remaining. A pump is coupled to the reservoir for pumping the liquid therefrom in metered volumes and responsive thereto transmitting a volume pumping signal. An integrator receives and integrates the volume pumping signal, and then generates, after receiving the first signal, an output signal indicative of the volume of the liquid remaining in the reservoir. An indicator is coupled to the integrator for displaying the output signal.

15 Claims, 1 Drawing Sheet

LOW LIQUID LEVEL MONITORING AND WARNING APPARATUS AND METHOD

FIELD OF THE INVENTION

The present invention relates to a warning system to advise the driver of a vehicle of the low level of a liquid, such as the oil level or the fuel level.

BACKGROUND OF THE INVENTION

Two stroke engines are known which are not lubricated by mixing oil with the fuel but by supplying accurately metered quantities of oil to the bearings in the crankcase by means of a positive displacement pump. With such engines, if no oil is available for lubrication, then the engine can seize and be severely damaged. It is therefore important to ensure that the level of oil in the oil reservoir is monitored at all times and to give the vehicle driver ample warning of a depletion in the oil level.

To this end, it is known to provide two oil level warning lights, the first giving advance warning to replenish the oil reservoir and the second advising the driver to switch off the engine immediately to prevent it from being damaged.

There are several disadvantages in using a system with two different level sensors and lights. First, there is the cost arising from the duplication of sensors and lights. Second, the vehicle dashboard must be modified to accommodate an extra warning light, and an additional wire must be included in the wiring harness for this purpose. If a manufacturer is to offer a vehicle with a choice of two stroke and four stroke engines, this would require the different variants of the same model to have different electrical systems. Furthermore, two warning lights for the same liquid level may confuse the driver and may even suggest to the driver that the early warning light can be safely disregarded.

OBJECT OF THE INVENTION

The present invention seeks to provide a liquid level warning system which mitigates the foregoing disadvantages, and in particular which dispenses with the need to modify the dashboard and the wiring harness.

Another object of the present invention is to utilize only a single level sensor for the liquid, and then to accumulate or integrate the volume of the liquid pumped from the reservoir subsequent to activation of the level sensor in order to indicate the relative level of the liquid remaining in the reservoir.

SUMMARY OF THE INVENTION

A sensor is coupled to the reservoir for generating a first signal responsive to the liquid level falling below a first level in the reservoir that is spaced above the output port and that is indicative of a reserve level of liquid remaining therein. A pump is coupled to the reservoir for pumping the liquid therefrom in metered volumes and responsive thereto transmitting a volume pumping signal. An integrator receives and integrates the volume pumping signal, and generates, after receiving the first signal, an output signal indicative of the volume of the liquid remaining in the reservoir. An indicator is coupled to the integrator for displaying the output signal.

The invention uses a single level sensor and indicator, which may be a light bulb or a sound generator. The level sensor may be the same as that conventionally used to provide an early warning indication. Then, instead of monitoring the liquid level by means of a second level sensor, the remaining quantity of liquid is derived by subtracting the amount of liquid drawn from the reservoir by the pump from the amount of liquid remaining when the low level warning indication was first activated. As the liquid level approaches more dangerously low levels, the indication provided to the driver may be modified to indicate the increasing urgency to replenish the reservoir.

In the case of a two stroke engine, the oil for lubricating the bearings, pistons and other engine internals is provided by a solenoid actuated, positive displacement pump which delivers the same volume of oil in each operating cycle. The quantity of oil drawn from the reservoir therefore can be estimated by counting the number of pulses applied to the solenoid of the pump.

The invention also could be used to indicate the quantity of fuel in the tank supplying a fuel injected engine, either spark ignited or diesel. Since in the case of a spark ignited engine the quantity of fuel is determined by the length of time that the injectors are open, it therefore is possible to integrate or accumulate the pulses applied to the injectors in order to estimate the quantity of fuel pumped from the tank and used by the engine.

In the case of a diesel engine with a mechanical pump, it is especially important to avoid running out of fuel in order to prevent air from entering the fuel lines and the fuel injection pump. In this case the quantity of fuel drawn from the tank can be estimated by integrating the product of the number of engine cycles and a signal representing the position of the lever which sets the quantity or volume of fuel injected during each cycle.

The warning signal given by the indicator, which is typically a warning light, can be modified in any desired way to indicate the increasing urgency of the need to replenish the liquid in the reservoir. Conveniently, the light may be arranged to flicker at an ever increasing repetition frequency as the liquid level is calculated to have dropped. Preferably, the light is arranged to remain fully illuminated when the reservoir is nearly empty.

In the case of an oil warning light, it is possible to arrange for the same indicator light to remain constantly on or fully illuminated to warn of a breakdown of the oil pump or of any other cause leading to the loss of oil to the bearings.

BRIEF DESCRIPTION OF THE DRAWING

The invention will now be described further, by way of example, with reference to the accompanying drawing which schematically represents a low liquid level warning system in accordance with the present invention.

DESCRIPTION OF THE PREFERRED EMBODIMENT

Figure 1:
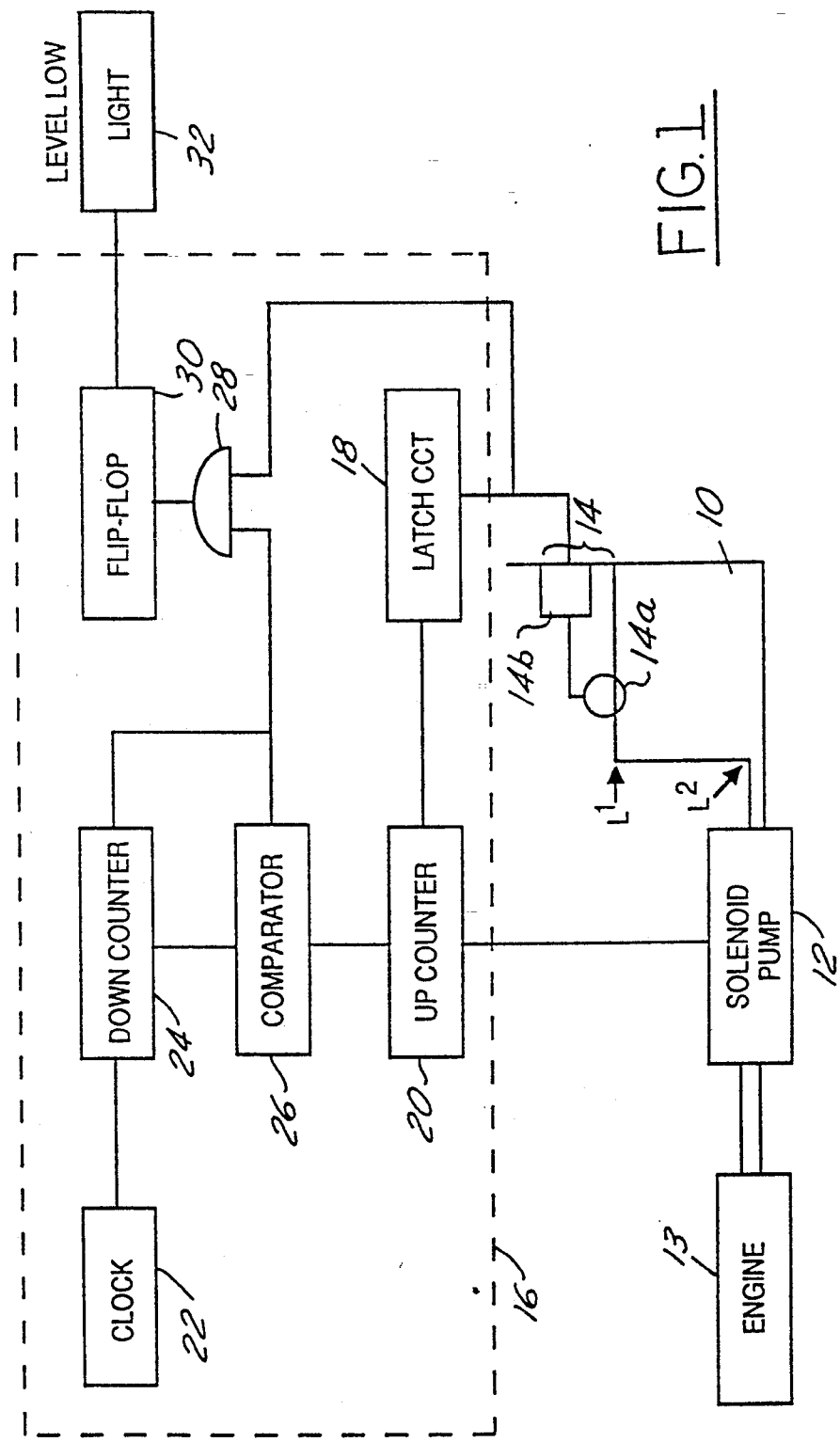

A reservoir 10 contains oil for lubricating a two stoke internal combustion engine 13. Oil is drawn from the reservoir 10 by a solenoid operated positive displacement pump 12 which supplies the oil under pressure directly to the bearings of the crankshaft in the engine 13.

A level sensing switch 14 acts to produce a first or initial warning signal when the oil in the reservoir 10 drops below a first predetermined level ($L^1$). The sensing switch 14 may be of any desired type. For example, it may, as shown, comprise a float 14a connected to a lever which operates a microswitch 14b or directly through a level switch.

Instead of being used to switch on a warning light directly, the output of the sensing switch 14 is applied to a circuit generally designated 16 which provides the vehicle operator with a more meaningful type of signal to warn of the low oil level in the reservoir 10.

The on/off type signal from the switch 14b is applied to a latch circuit 18. The output of this circuit 18 goes high after a signal has been produced continuously by the switch 14 for more than a predetermined time, for example, 60 seconds in the preferred embodiment. This delay is provided to ensure that a warning signal is not produced by a temporary variation in the liquid level caused by movement of the vehicle and/or liquid sloshing in the reservoir. The output signal remains high until the liquid in the reservoir 10 is replenished, whereupon the signal at the output of the sensor 14 goes low.

As soon as the output signal of the latch circuit 18 goes high, an up counter 20 is reset. Thereafter the up counter 20 counts the energizing pulses applied to the solenoid of the positive displacement pump 12. The count developed in the up counter 20 represents the volume of oil drawn by the pump after the threshold level of the switch 14 has been reached. As this count increases, the oil level approaches a danger level $L_2$ characterized by the reservoir becoming totally empty and the engine possibly seizing.

A clock 22, which produces pulses at a fixed rate, has an output coupled to the input of a down counter 24. The output of the counters 20 and 24 are compared in a comparator 26, and when the count of the down counter 24 is equal to or less than that of the up counter 20, the output signal of the comparator goes high. This comparator output acts first to reset the down counter 24, and then is passed through an AND gate 28 to the input of a flip-flop 30. The flip-flop 30 acts as a one shot multivibrator which produces a pulse of predetermined duration for energizing an indicator light 32. Since the second input to the AND gate 28 is coupled to the output of the switch 14, the AND gate 28 ensures that the indicator light 32 can only be switched on when the oil level has dropped below the first or threshold level ($L^1$) of the sensor switch 14.

Immediately after the oil level drops below threshold level $L^1$, the count in counter 20 will be low. The down counter 24 will take relatively more cycles of the clock 22 to reach this value, and therefore the comparator 26 will produce output pulses relatively infrequently. This low frequency will cause the indicator light 32 to pulse with low frequency.

As the count in the up counter 20 increases, representing more oil being drawn from the reservoir 10, relatively less time is required for the counter 24 to count down during each cycle, thereby increasing the pulse repetition frequency. When the count in the counter 20 reaches the value of the count to which the counter 24 is reset, then the indicator light will remain on constantly to warn of imminent danger, namely the liquid reaching level $L^2$ in the reservoir. Of course, the reset value for down counter 24 may be calibrated and adjusted depending on the volume of the reservoir 10 between levels $L^1$ and $L^2$ and the volume of liquid pumped by on cycle of the positive displacement solenoid pump 12.

It will be clear that various modifications can be made to this circuit. For example, one may use analog circuitry in order to process and integrate the signals representing the cumulative volume of the liquid pumped subsequent to the liquid in the reservoir falling below the threshold level $L^1$. Also, a microcomputer could be used to implement the described functions in software rather than hardware. In this regard, the digital signals representing the volume of the liquid pumped subsequent to the liquid in the reservoir falling below the threshold level $L^1$ could be integrated or summed in the microprocessor and then compared to a look-up table characterizing the volume of the liquid remaining in the reservoir. The results of this comparison would then be used in generating the visual or audible signals to alert the driver of the vehicle as to the relative volume of liquid remaining in the reservoir before level $L^2$ is reached.

It should be clear that the invention may be applied to fuel reservoirs other than oil reservoirs, and that it may be used even when the pump is not actuated electrically. Thus, in a diesel engine the engine revolutions may be used to gate to a counter a value representing the position of the fuel setting lever of a mechanical injection pump. In the case of a fuel injected spark ignited engine, a count may be developed to indicate the integral of the time that the injection nozzles are open.

The preceding description of the preferred embodiment should be taken as an example of the invention, which should be limited only by the following claims:

I claim:

1. A system for detecting the level of a liquid being drawn from an output port of a reservoir, comprising:

pump means, operatively coupled to the reservoir at the output port, for pumping metered volumes of the liquid from the reservoir and generating volume pumping signals representative thereof, sensing means coupled to the reservoir for generating a first signal responsive to the liquid level falling below a first level in the reservoir spaced operatively above the output port for indicating a reserve level of liquid remaining, integrator means, operatively coupled to said pump means and said sensing means, for integrating said volume pumping signals and responsive thereto generating, subsequent to receiving said first signal, a composite signal representative of the volume of the liquid remaining in the reservoir above the output port, and indicator means coupled to said integrator means for displaying said composite signal.

2. The liquid level detection system described in claim 1, wherein said indicator means comprises means for generating a visual signal having a visual intensity representative of said composite signal.

3. The liquid level detection system as described in claim 1 wherein said integrator means includes microcomputer means for cumulating and then subtracting the metered volumes of the liquid pumped from the reservoir from a known volume in the reservoir located between said first level and the output port.

4. The liquid level detection system as described in claim 1 wherein the liquid is oil and wherein said pump means is coupled to a two stroke internal combustion engine for injecting oil thereinto.

5. The liquid level detection system as described in claim 4 wherein said pump means comprises solenoid actuated positive displacement pump means for delivering said metered volume of the liquid on each pumping cycle and transmitting at least one pumping pulse as said volume pumping signals responsive thereto.

6. The liquid level detection system as described in claim 5 wherein said integrator means includes means for counting said at least one pumping pulse and responsive thereto calculating the volume of oil pumped from the reservoir after the oil level drops below said first level.

7. The liquid level detection system as described in claim 1 wherein the liquid is fuel and wherein said pump means is coupled to an internal combustion engine for injecting fuel thereinto, and wherein:
   said pump means comprises solenoid actuated positive displacement pump means for delivering said metered volume of liquid on each pumping cycle and transmitting at least one pumping pulse as said volume pumping signals responsive thereto, and wherein
   said integrator means includes means for counting said at least one pumping pulse and responsive thereto calculating the volume of fuel pumped from the reservoir after the fuel level drops below said first level.

8. The liquid level detection system as described in claim 1 wherein said indicator means comprises a light for visually displaying an illumination intensity proportional to said composite signal.

9. The liquid level detection system as described in claim 8 wherein said light is illuminated only after said integrator means receives said first signal from said sensing means.

10. A system for detecting the level of oil pumped from an output port of a reservoir for injection into a two stroke internal combustion engine, comprising:
    solenoid actuated positive displacement pump means, operatively coupled between the engine and the reservoir at the output port, for pumping on each pumping cycle a metered volume of oil from the reservoir and for generating a volume pumping signal having at least one pumping pulse responsive thereto,
    sensing means coupled to the reservoir for generating a first signal responsive to the oil level falling below a first level in the reservoir spaced operatively above the output port for indicating a reserve level of oil remaining in the reservoir,
    integrator means, operatively coupled to said pump means and said sensing means, for counting said at least one pumping pulse and responsive thereto generating, subsequent to receiving said first signal, a composite signal representative of the volume of oil remaining in the reservoir below said first level, and
    indicator means coupled to said integrator means for displaying said composite signal, said indicator means comprising means for generating a visual signal having an intensity representative of said composite signal.

11. The liquid level detection system as described in claim 10 wherein said integrator means includes programmable microcomputer means for cumulating the volume of the oil pumped from the reservoir and then subtracting said volume of oil pumped from a known volume in the reservoir located between said first level and the output port.

12. The liquid level detection system as described in claim 10 wherein said integrator means includes means for counting said pumping pulses and responsive thereto calculating said metered volume of oil pumped from the reservoir after the oil level drops below said first level.

13. A method for detecting the level of a liquid being pumped from an output port of a reservoir on an automotive vehicle, comprising:
    a. pumping metered volumes of the liquid from the reservoir and generating at least one volume pumping pulse responsive to each of the metered volumes pumped,
    b. generating a first signal responsive to the liquid level falling below a first level in the reservoir spaced operatively above the output port for indicating a reserve level of liquid remaining in the reservoir,
    c. counting said at least one volume pumping pulse and responsive thereto generating, only subsequent to receiving said first signal, a second signal representative of the volume of the liquid remaining in the reservoir below said first level, and
    d. visually displaying a representation of said second signal, thereby providing a visual warning indication as the level of the liquid in the reservoir is pumped below said first level.

14. The method as described in claim 13 wherein step c includes the step of cumulating said at least one volume pumping pulse representative of the metered volumes of liquid pumped and then subtracting the metered volumes of the liquid pumped from the reservoir from a known volume in the reservoir located between said first level and the output port.

15. The method as described in claim 13 wherein the pumping step further includes the step of energizing a solenoid actuated positive displacement pump for pumping said metered volume of liquid on each pumping cycle.

* * * * *